(12) United States Patent
Kwon et al.

(10) Patent No.: US 8,512,913 B2
(45) Date of Patent: Aug. 20, 2013

(54) ELECTRODE FOR FUEL CELL AND FUEL CELL EMPLOYING THE SAME

(75) Inventors: Kyung-jung Kwon, Suwon-si (KR); Myung-jin Lee, Seoul (KR)

(73) Assignees: Samsung Electronics Co., Ltd., Suwon-si, Gyeonggi-do (KR); Samsung SDI Co., Ltd, Suwon-si, Gyeonggi-do (KR)

( * ) Notice: Subject to any disclaimer, the term of this patent is extended or adjusted under 35 U.S.C. 154(b) by 906 days.

(21) Appl. No.: 12/030,246

(22) Filed: Feb. 13, 2008

(65) Prior Publication Data
US 2008/0305376 A1    Dec. 11, 2008

(30) Foreign Application Priority Data
Jun. 8, 2007   (KR) ................. 10-2007-0056053

(51) Int. Cl.
  H01M 4/02   (2006.01)
  H01M 4/36   (2006.01)
  H01M 4/92   (2006.01)
  H01M 8/10   (2006.01)

(52) U.S. Cl.
  USPC ............ 429/523; 429/484; 429/487; 429/524

(58) Field of Classification Search
  USPC .................. 429/523, 524, 484, 487
  See application file for complete search history.

(56) References Cited

U.S. PATENT DOCUMENTS

| | | | |
|---|---|---|---|
| 5,766,445 A * | 6/1998 | Hashizume et al. | 205/414 |
| 6,087,032 A * | 7/2000 | Yoshitake et al. | 429/480 |
| 6,262,257 B1 | 7/2001 | Gale et al. | |
| 7,041,819 B2 * | 5/2006 | Sessler et al. | 540/145 |
| 7,122,572 B2 | 10/2006 | Gale et al. | |
| 7,579,116 B2 * | 8/2009 | Mance et al. | 429/315 |
| 7,632,591 B2 * | 12/2009 | Won et al. | 429/492 |
| 7,722,981 B2 * | 5/2010 | Jang et al. | 429/493 |
| 2006/0222921 A1 * | 10/2006 | Mance et al. | 429/30 |

OTHER PUBLICATIONS

Polarography and Pulse Voltammetry, Chapter 7, p. 288.
F.C. Nart et al. "On the Adsorption of H2PO4 and H3PO4 on Platinum: An In Situ FT-ir Study", Electrochimica Acta, vol. 37, No. 3, pp. 385-291, 1992.
J.C. Huang et al. "The Effects of Cations and Anions on Hydrogen Chemisorption at Pt", J. Electrochemical Society, vol. 124, No. 11, pp. 1732-1737, Nov. 1977.
M.C. Santos et al. "Study of Anion Adsorption on Polycrystalline Pt by Electrochemical Quartz Crystal Microbalance", Electrochemistry Communications 2, pp. 692-696, 2000.
P. Zelenay et al. "Adsorption from Solution on Platinum: An in Situ FTIR and Radiotracer Study", Longmuir 2, pp. 393-405, 1986.

* cited by examiner

Primary Examiner — Patrick Ryan
Assistant Examiner — Julian Anthony
(74) Attorney, Agent, or Firm — Lee & Morse, P.C.

(57) ABSTRACT

Provided are an electrode for a fuel cell and a fuel cell employing the electrode, the electrode comprising a catalyst layer including: a catalyst; a material having stronger binding force to anions than the catalyst; and a binder. According to the electrolyte for a fuel cell, electrochemical surface area of the catalyst is maximized, and thus efficiencies in oxygen reduction reaction (ORR) and hydrogen oxidation reaction (HOR) of the catalyst are improved. Thus, a fuel cell having improved power generation efficiency may be prepared by employing the electrode.

16 Claims, 10 Drawing Sheets

ELECTRODE FOR FUEL CELL AND FUEL CELL EMPLOYING THE SAME

CROSS-REFERENCE TO RELATED PATENT APPLICATION

This application claims the benefit of Korean Patent Application No. 10-2007-0056053, filed on Jun. 8, 2007, in the Korean Intellectual Property Office, the disclosure of which is incorporated herein in its entirety by reference.

BACKGROUND OF THE INVENTION

1. Field of the Invention

The present invention relates to an electrode for a fuel cell and a fuel cell employing the same, and more particularly, to an electrode for a fuel cell having improved power generation efficiency by increasing efficiencies of oxygen reduction reaction (ORR) and hydrogen oxidation reaction (HOR) by enlarging the electrochemical surface area of a catalyst, and a fuel cell employing the electrode.

2. Description of the Related Art

In electrochemical systems, electrolytes include a solvent, cations and anions. The anions are often adsorbed to an electrode to decrease surface area of the electrode. The anions adsorbed to the electrode cause problems in fuel cells which usually use Pt as an electrode catalyst.

In particular, since fuel cells employing phosphoric acid as an electrolyte, such as high temperature polymer electrolyte membrane fuel cells (PEMFCs) that operate at 100° C. or a higher temperature and phosphoric acid fuel cells (PAFCs), use a highly concentrated phosphoric acid, phosphate anions of the phosphoric acid are adsorbed to Pt which is a catalyst metal, and thus performance of the fuel cells seriously decreases.

As described above, since surface area of the catalyst for electrochemical reactions may be reduced, a large amount of the expensive Pt catalyst needs to be used in the electrodes. Therefore, costs for manufacturing fuel cells are high and practical use of the fuel cells cannot be facilitated.

SUMMARY OF THE INVENTION

The present invention provides an electrode for a fuel cell having improved power generation efficiency by maximizing electrochemical surface area of a catalyst with a small amount, and a fuel cell employing the electrode.

According to an aspect of the present invention, there is provided an electrode for a fuel cell, the electrode comprising a catalyst layer including: a catalyst; a material having stronger binding force to anions than the catalyst; and a binder.

According to another aspect of the present invention, there is provided a fuel cell including the electrode and an electrolyte membrane interposed between the electrodes.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
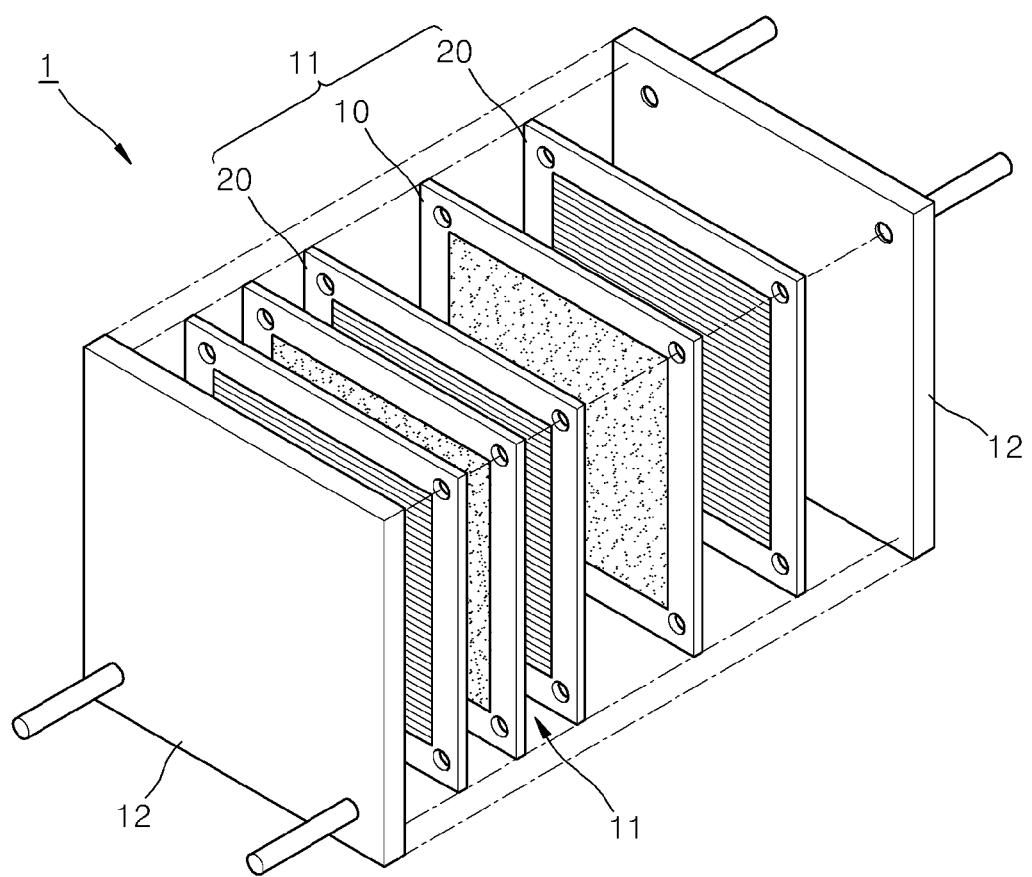
FIG. 1 shows a perspective view of a fuel cell according to an embodiment of the present invention.

Hereinafter, the present invention will now be described more fully with reference to the accompanying drawings, in which exemplary embodiments of the invention are shown.

An electrode according to the present invention maximizes electrochemical surface area of a catalyst by effectively inhibiting an anion used as an electrolyte such as a phosphate group from being adsorbed on the surface of the catalyst by adding a material having stronger binding force to anions than the catalyst. Here, the term "electrochemical surface area (ECSA)" of the catalyst, indicates surface area of the catalyst which contacts the electrolyte and participates in electrochemical reactions.

The amount of the material having stronger binding force to anions than the catalyst may be in the range of 0.05 to 0.5 parts by weight based on 1 part by weight of the catalyst. Here, the weight of the catalyst is the weight of a catalyst metal included in the catalyst.

When the amount of the material having stronger binding force to anions than the catalyst is less than 0.05 parts by weight, effects of adding the material are negligible. On the other hand, when the amount of the material having stronger binding force to anions than the catalyst is greater than 0.5 parts by weight, electrical conductivity of the electrode may decrease due to the presence of too large amounts of a non-conductive pyrrole-based compound.

The material having stronger binding force to anions than the catalyst, which can aid in maximizing electrochemical surface area of the catalyst, may be a pyrrole-based compound represented by Formula 1 below.

Formula 1

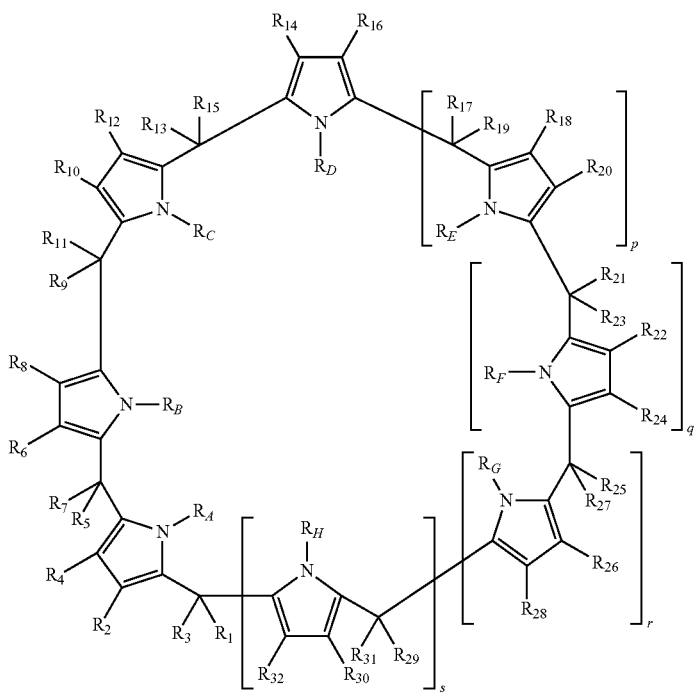

Here, p, q, r and s are each independently 0 or 1 and described below:

when p=q=r=s=0, $R_1$-$R_{16}$ are each independently a substituent listed in paragraph i) below, and $R_A$-$R_D$ are each independently a substituent listed in paragraph ii) below;

when p=1 and q=r=s=0, $R_1$-$R_{20}$ are each independently a substituent listed in paragraph i) below, and $R_A$-$R_E$ are each independently a substituent listed in paragraph ii) below;

when p=q=1 and r=s=0, $R_1$-$R_{24}$ are each independently a substituent listed in paragraph i) below, and $R_A$-$R_F$ are each independently a substituent listed in paragraph ii) below;

when p=q=r=1 and s=0, $R_1$-$R_{28}$ are each independently a substituent listed in paragraph i) below, and $R_A$-$R_G$ are each independently a substituent listed in paragraph ii) below; and when p=q=r=s=1 and $R_1$-$R_{32}$ are each independently a substituent listed in paragraph i) below, and $R_A$-$R_H$ are each independently a substituent listed in paragraph ii) below, wherein paragraph i) and ii) are as follows:

i) a hydrogen atom, a halide, a hydroxyl group, a C1-C20 alkyl group, a C2-C20 alkenyl group, a C2-C20 alkynyl group, a C6-C20 aryl group, a C7-C20 alkylaryl group, a nitro group, a formyl group, a C1-C20 acyl group, a C1-C20 hydroxyalkyl group, a C1-C20 alkoxy group, a C1-C20 hydroxyalkoxy group, a C2-C20 hydroxyalkenyl group, a C2-C20 hydroxyalkynyl group, a C1-C20 alkylcarboxyl group, a carboxyl group, and an amide group, and ii) a hydrogen atom, a C1-C20 alkyl group, a C1-C20 alkylsulfone group, a C1-C20 carboxyalkyl group, a C1-C20 carboxyamidealkyl group, and a C6-C20 aryl group.

The pyrrole-based compound may be easily prepared from a pyrrole and a simple ketone, and used as a host material since liquid and solid states of the pyrrole-based compound function as a host for fluoride and chloride ions. The pyrrole-based compound can be included in a fuel cell due to excellent thermal stability and high thermal decomposition temperature of the pyrrole-based compound since it operates at a higher temperature than the temperature at which high temperature proton exchange membrane fuel cells (PEMFCs) or phosphoric acid fuel cells (PAFCs). In addition, since the pyrrole-based compound combines with an anion of an electrolyte such as phosphate groups to increase electrochemical surface area of the catalyst such as Pt, it can be added to the electrode or the electrolyte in order to increase the electrochemical surface area of the catalyst. In particular, since a large amount of the pyrrole-based compound is required when the pyrrole-based compound is added to a phosphoric acid electrolyte bulk solution having a relatively large amount of the phosphate groups, it is more effective to combine the pyrrole-based compound with the phosphates disposed only on the surface of the electrode by adding the pyrrole-based compound to the electrode to enlarge electrochemical surface area of Pt.

The pyrrole-based compound may be represented by Formula 2 below.

Formula 2

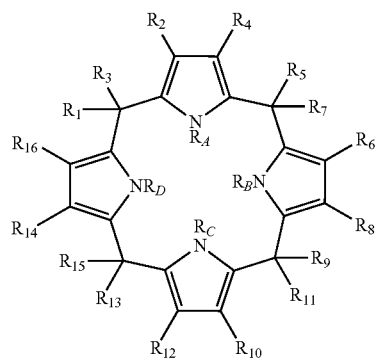

Here, $R_1$, $R_3$, $R_5$, $R_7$, $R_9$, $R_{11}$, $R_{13}$, $R_{15}$ are C1-C10 alkyl groups, $R_2$, $R_4$, $R_6$, $R_8$, $R_{10}$, $R_{12}$, $R_{14}$, $R_{16}$ are hydrogen atoms, and $R_A$, $R_B$, $R_C$, $R_D$ are hydrogen atoms.

The pyrrole-based compound may be represented by Formula 3 below.

Formula 3

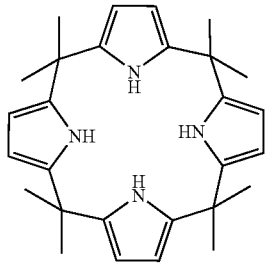

The electrode for a fuel cell according to the present invention includes a catalyst layer having a catalyst, a material having stronger binding force to anions than the catalyst; and a binder.

The catalyst may be at least one of Pt and a Pt-based alloy such as PtCo and PtRu. A supported catalyst in which a catalyst metal is loaded on a carbonaceous support may be used as the catalyst. Here, the carbonaceous support may be carbon black, or the like, and the amount of the catalyst metal may be in the range of 10 to 150 parts by weight based on 100 parts by weight of the supported catalyst.

Any material that can provide the catalyst layer of the electrode with binding force toward a current collector may be used as the binder. Examples of the binder include poly(vinylidene fluoride), polytetrafluoroethylene (PTFE), a tetrafluoroethylene-hexafluoroethylene copolymer, fluorinated ethylene propylene (FEP), styrene-butadiene rubber (SBR), and polyurethane, but are not limited thereto. The amount of the binder may be in the range of 0.001 to 0.5 parts by weight based on 1 part by weight of the catalyst. When the amount of the binder is less than 0.001 parts by weight, a wet state of the electrode is not sufficiently improved. On the other hand, when the amount of the binder is greater than 0.5 parts by weight, flooding may occur.

A process of preparing an electrode for a fuel cell according to the present invention will be described.

First, a composition for an electrode catalyst layer is prepared by mixing a catalyst, a material having stronger binding force to anions than the catalyst, a binder and a solvent.

The solvent may be N-methylpyrrolidone (NMP), dimethylacetamide (DMAC), or the like, and the amount of the solvent may be in the range of 1 to 10 parts by weight based on 1 part by weight of the catalyst.

The composition for an electrode catalyst layer is coated on the surface of a carbon support to prepare an electrode. Here, the carbon support may be fixed on a glass substrate to facilitate the coating. The coating may be performed using a doctor blade coating method, a bar coating method, a screen printing method, or the like, but the coating method is not limited thereto.

The coated composition for an electrode catalyst is dried to evaporate the solvent at a temperature in the range of 20 to 150° C. The composition may be dried for 10 to 60 minutes, but the drying time may vary according to the drying temperature. The composition may be dried at room temperature for 1 hour, at 60° C. for 15 minutes or more, at 80° C. for 10 minutes or more, and at 120° C. for 10 minutes or more.

The electrode for a fuel cell prepared according to the process described above may further include an electrolyte which is an acidic dopant.

A phosphoric acid or an organic phosphonic acid may be used as the electrolyte. The phosphoric acid may be metaphosphoric acid, orthophosphoric acid, paraphosphoric acid, triphosphoric acid, tetraphosphoric acid, or the like, and preferably orthophosphoric acid. The organic phosphonic acid may be a C1-C10 alkylphosphonic acid such as methylphosphonic acid, ethylphosphonic acid and propylphosphonic acid, vinylphosphonic acid, phenylphosphonic acid, or the like, and preferably vinylphosphonic acid.

When the phosphoric acid or organic phosphonic acid is used in an aqueous solution as the electrolyte, the concentration of the aqueous of the phosphoric acid or the organic phosphonic acid may be in the range of 20 to 100% by weight.

The electrode for a fuel cell according to the present invention is efficiently used in a high temperature PEMFC or PAFC.

Hereinafter, a fuel cell according to an embodiment of the invention will be described in detail.

Figure 2:
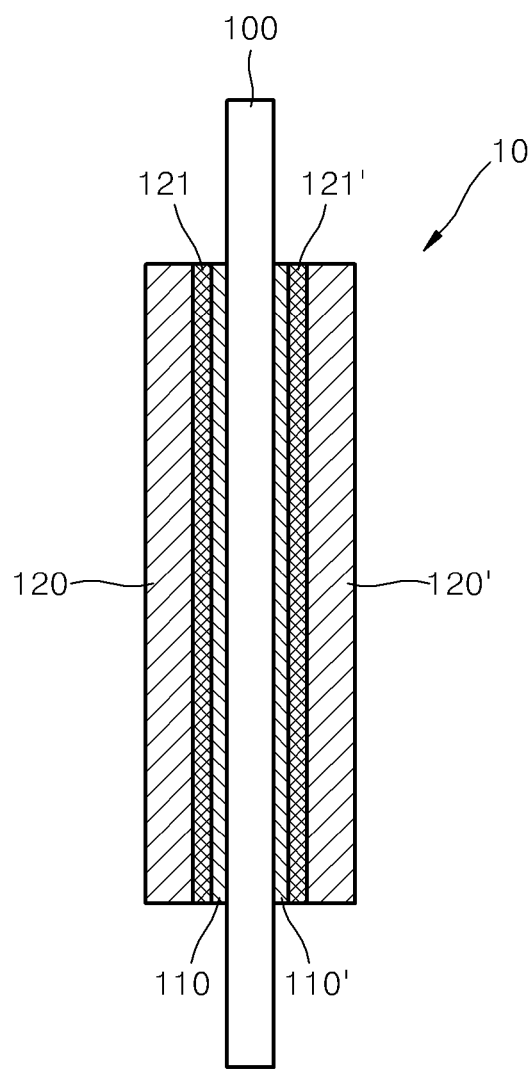
FIG. 2 schematically shows a cross-sectional view of a membrane-electrode assembly included in the fuel cell of FIG. 1.

FIG. 1 shows a perspective view of a fuel cell according to an embodiment of the present invention, and FIG. 2 schematically shows a cross-sectional view of a membrane-electrode assembly included in the fuel cell of FIG. 1.

Referring to FIG. 1, a fuel cell 1 includes two unit cells 11 which are supported by a pair of holders 12. Each unit cell 11 includes a membrane-electrode assembly 10 and bipolar plates 20 which are disposed on either side of the membrane-electrode assembly. The bipolar plates 20 are formed of a conductive material such as a metal or carbon, and are respectively assembled with the membrane-electrode assembly 10. Thus, the bipolar plates 20 function as current collectors and supply oxygen and fuel into a catalyst layer of the membrane-electrode assembly 10.

In addition, the fuel cell 1 shown in FIG. 1 has two unit cells 11, but the number of the unit cells 11 is not limited and may be up to several hundreds according to the characteristics required for the fuel cell 1.

The membrane-electrode assembly 10 includes a polymer electrolyte membrane for a fuel cell (hereinafter, electrolyte membrane) 100, catalyst layers 110 and 110' disposed on either side of the electrolyte membrane 100, first gas diffusion layers 121 and 121' respectively formed on the catalyst layers 110 and 110', and second gas diffusion layers 120 and 120' respectively formed on the first gas diffusion layers 121 and 121' as shown in FIG. 2.

The catalyst layers 110 and 110' which function as a fuel electrode and an oxygen electrode include a catalyst, a material increasing electrochemical surface area of the catalyst, and a binder.

The first gas diffusion layers 121 and 121' and the second gas diffusion layers 120 and 120' are formed of, for example, carbon sheet or carbon paper and diffuse oxygen and fuel supplied through the bipolar plates 20 throughout the catalyst layers 110 and 110'.

The fuel cell 1 including the membrane-electrode assembly 10 operates at a temperature in the range of 100 to 300° C. A fuel, for example, hydrogen is supplied into a first catalyst layer through the bipolar plate 20, and an oxidizer, for example, oxygen is supplied into a second catalyst layer through the bipolar plate 20. Then, hydrogen is oxidized to protons in the first catalyst layer, an electrolyte membrane 4 conducts the protons to the second catalyst layer, and the conducted protons electrochemically react with oxygen in the second catalyst layer to form water and generate electric energy.

In addition, hydrogen supplied as a fuel may be generated by modification of hydrocarbon or alcohol, and oxygen supplied as an oxidizer may be supplied with air.

Subsequently, the electrolyte membrane 100 included in the membrane-electrode assembly 10 will be described.

Any electrolyte membrane that is commonly used for a fuel cell can be used as the electrolyte membrane 100. Examples of the electrolyte membrane 100 include polybenzimidazole electrolyte membrane, polybenzoxazine-polybenzimidazole copolymer electrolyte membrane, and polytetrafluoroethylene (PTFE) electrolyte membrane.

The electrolyte membrane further includes an electrolyte in addition to the listed polymer. The electrolyte may be a phosphoric acid or an organic phosphonic acid which is the same as the electrolyte included in the electrode catalyst layer.

The impregnation amount (doping amount) of the polymer for forming the electrolyte membrane with the electrolyte may be in the range of 20 to 2000% by mole, and preferably 50 to 1500% by mole, for a polymer repeating unit such as polybenzimidazole. When the impregnation amount of the acidic dopant is greater than 20% by mole, proton conductivity of the electrolyte membrane may be sufficiently high, and satisfactory power generation characteristics may be expressed when the electrolyte membrane is employed in the fuel cell. In addition, when the impregnation amount of the acidic dopant is less than 2000% by mole, the polymer is not dissolved since the impregnation amount of the polymer is not excessive, and thus the proton conductivity can be stably maintained over a long period of time.

The present invention will now be described in greater detail with reference to the following examples. The following examples are for illustrative purposes only and are not intended to limit the scope of the present invention.

Synthesis Example 1

Preparation of Pyrrole-Based Compound 5 mmol of a pyrrole (A) and 2.5 mmol of a ketone (B) were dissolved in 45 ml of anhydrous ethanol, 0.3 g of boron trifluoride diethyl etherate ($BF_3 \cdot OEt_2$) was added to the solution, and the solution was stirred at room temperature for one week.

When the reaction was completed, the solvent was removed to obtain a viscous product. The product was dissolved in dichloromethane and washed several times with ammonia water. Then, an aqueous solution layer obtained therefrom was subjected to extraction using dichloromethane, and an organic layer was dried using anhydrous sodium sulfate and purified by chromatography to obtain a pyrrole-based compound represented by Formula 3.

Reaction Scheme 1

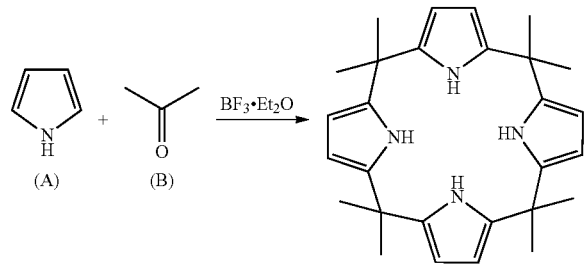

Figure 3:
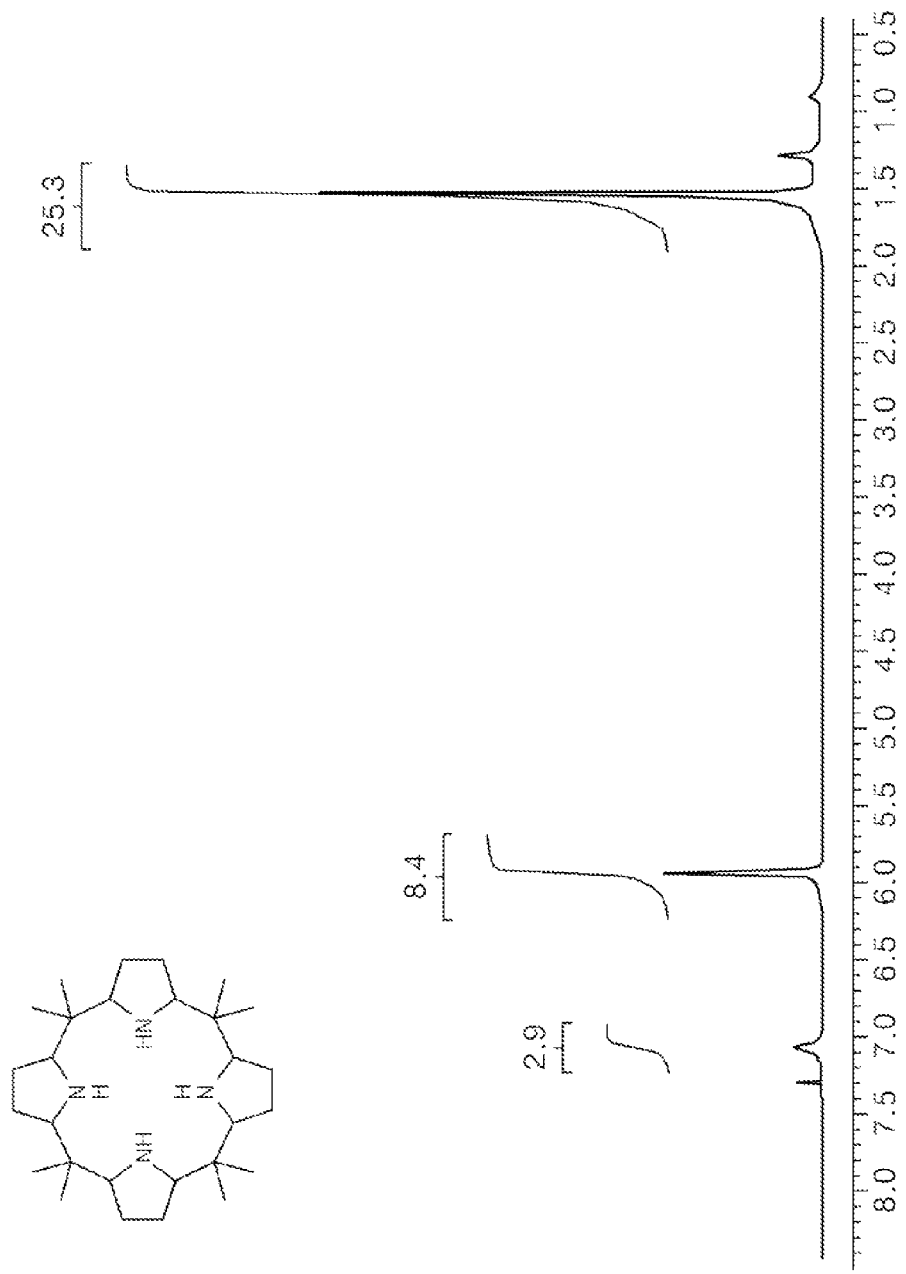
FIG. 3 shows a graph illustrating a nuclear magnetic resonance (NMR) spectrum of a pyrrole-based compound prepared according to Synthesis Example 1 of the present invention.

The structure of the pyrrole-based compound obtained according to Synthesis Example 1 was identified using a nuclear magnetic resonance (NMR) spectrum shown in FIG. 3. A 300 MHz Bruker AM300 was used during the NMR analysis.

Referring to FIG. 3, the NH group of the pyrrole was identified at a chemical shift of 7.1, the CH group of the pyrrole was identified at a chemical shift of 6.0, and the hydrogen of the methyl group was identified at a chemical shift of 1.6.

Figure 4:
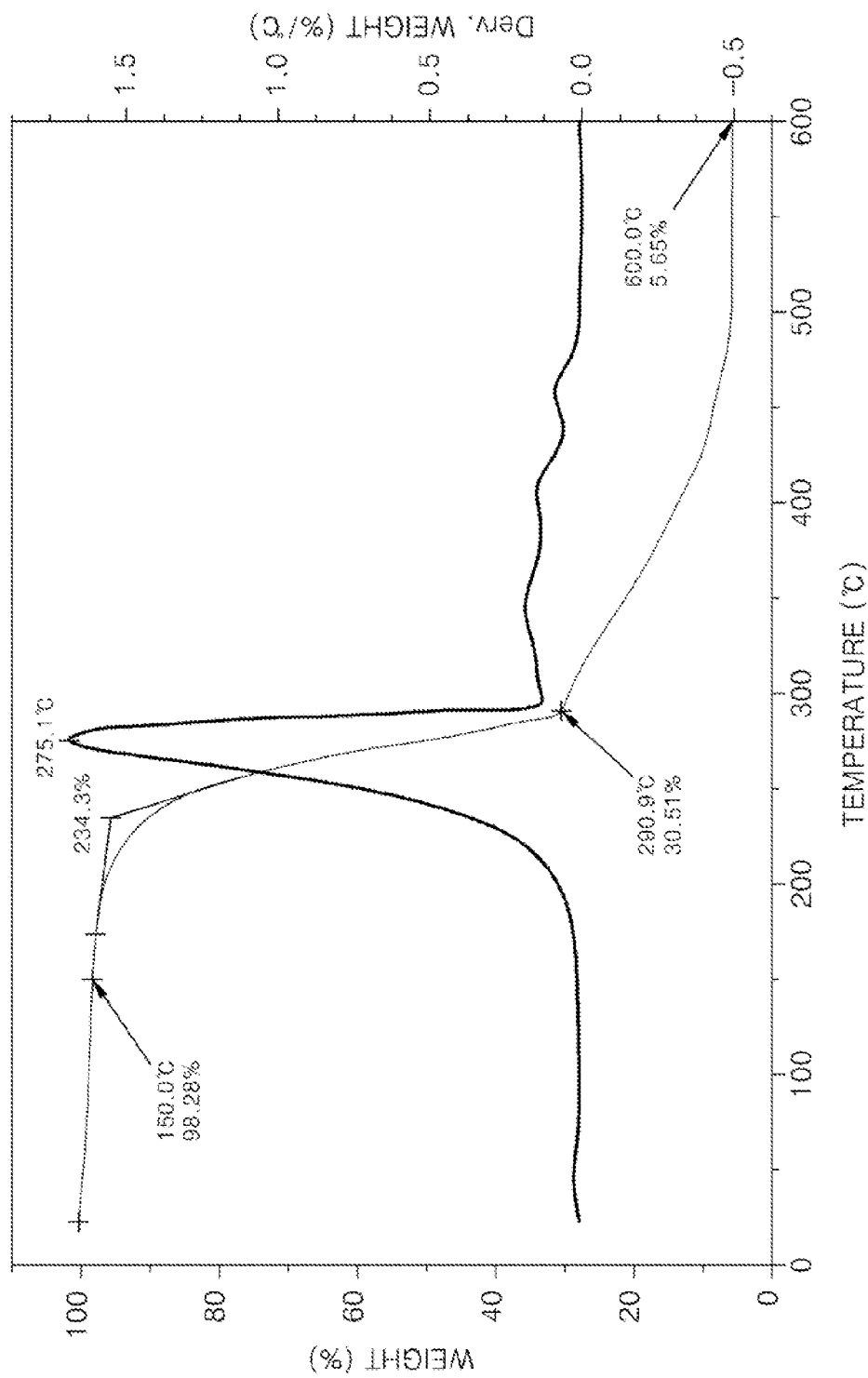
FIG. 4 shows a graph illustrating thermogravimetric analysis (TGA) results of a pyrrole-based compound prepared according to Synthesis Example 1 of the present invention.

Thermo gravimetric analysis (TGA) was carried out to measure thermal stability of the pyrrole-based compound prepared according to Synthesis Example 1, and the results are shown in FIG. 4. A TGA was carried out using a TGA TA 2050 at a temperature in the range of room temperature to 600° C. under air atmosphere using a platinum pan.

Referring FIG. 4, thermal decomposition temperature (Td) of the pyrrole-based compound was 234.3° C. (onset) and the residual amount was 5.65% at 600° C.

Example 1

Preparation of Electrode

The composition of the pyrrole-based compound represented by Formula 3 was optimized by preparing an electrode for a rotating disk electrode (RDE). The fundamental process of preparing an electrode for a MEA of a fuel cell and an electrode for RDE are the same except that the amount of binder which fixes catalyst particles to a substrate (carbon paper for the MEA and glassy carbon for the RDE) is slightly different between the electrode for a MEA of a fuel cell and the electrode for RDE.

An MEA was prepared using the optimized composition of Pt and the pyrrole-based compound by RDE to evaluate efficiency improvement of the fuel cell.

The electrode for a fuel cell was prepared according to the following process.

Viscosity of the composition was adjusted for coating on the substrate by varying the amount of the pyrrole-based compound while fixing the amount of Pt (46% by weight)/C obtained from Tanaka Precious Metals Group and adding an appropriate amount of NMP solvent. Polyvinylidene fluoride (PVDF) dissolved in the same solvent was added to the mixed solution to prepare slurry for a cathode.

The slurry for a cathode was coated on carbon paper which is coated with a microporous layer using a bar coater, and dried by raising the temperature from room temperature to 150° C. step by step to prepare a cathode for an MEA.

The electrode for RDE was prepared by applying slurry having a different amount of the PVDF binder to glassy carbon and drying the slurry without performing a coating process.

An anode for a MEA was prepared in the same manner as in the preparation of the cathode except that Pt (30% by weight) Ru (23% by weight)/C obtained from Tanaka Precious Metals Group was used as the catalyst.

Figure 5:
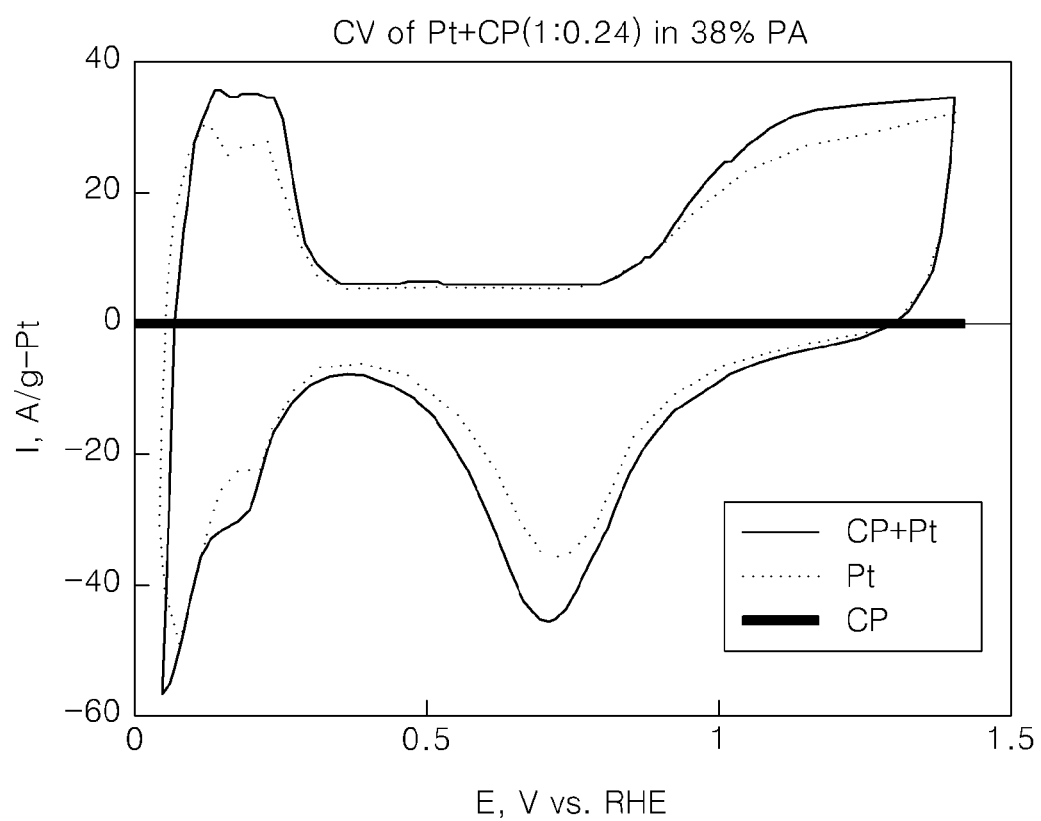
FIG. 5 shows a graph illustrating analysis results of cyclic voltammetry of an electrode prepared according to Example 1 of the present invention.

A cyclic voltammetry was carried out in order to measure the electrochemical surface area (ECSA) of the catalyst in the electrode prepared according to Example 1, and the results are shown in FIG. 5. Here, the weight ratio of platinum and the pyrrole-based compound of Formula 3 in the mixture was 1:0.24, and 38% by weight of a phosphoric acid aqueous solution was used as an electrolyte. The scan speed was about 50 mV/s. The y-axis of FIG. 5 shows current standardized using Pt per unit gram, and the x-axis shows electric potential (E) converted using a reference hydrogen electrode (RHE).

ECSA of Pt increased when the pyrrole-based compound was added thereto compared to that of when Pt was used alone based on the amount of charge at hydrogen desorption peak that is used to estimate ECSA of Pt, wherein ESCA is an area calculated by subtracting background values from each of positive current values of the electric double layer at the electric potential range between 0.05 to 0.4 V and positive current values at the electric potential range between 0.4 to 0.8 V. Here, it can be seen that the pyrrole-based compound does not act as the catalyst but is combined with phosphates which are adsorbed to Pt, and thus the surface area of Pt increases with reference to current values of the pyrrole-based compound (negligible compared to Pt) which do not have electrochemical activity throughout the entire electric potential range.

It can be seen that the surface area of Pt increases since the current of the electrode having a pyrrole-based compound is higher than the electrode having only Pt in Pt-related peaks besides the hydrogen desorption peak such as hydrogen adsorption peak which is negative current at an electric potential range of −0.05 and 0.3V, Pt oxide forming peak which is positive current at an electric potential range of −0.9 and 1.4V, and Pt oxide reduction peak which is negative current at an electric potential range of −0.5 and 1V.

Although not shown herein, ECSA of Pt increased in the electrode including the pyrrole-based compound in solutions having different phosphoric acid concentrations (3% by weight and 20% by weight).

Figure 6:
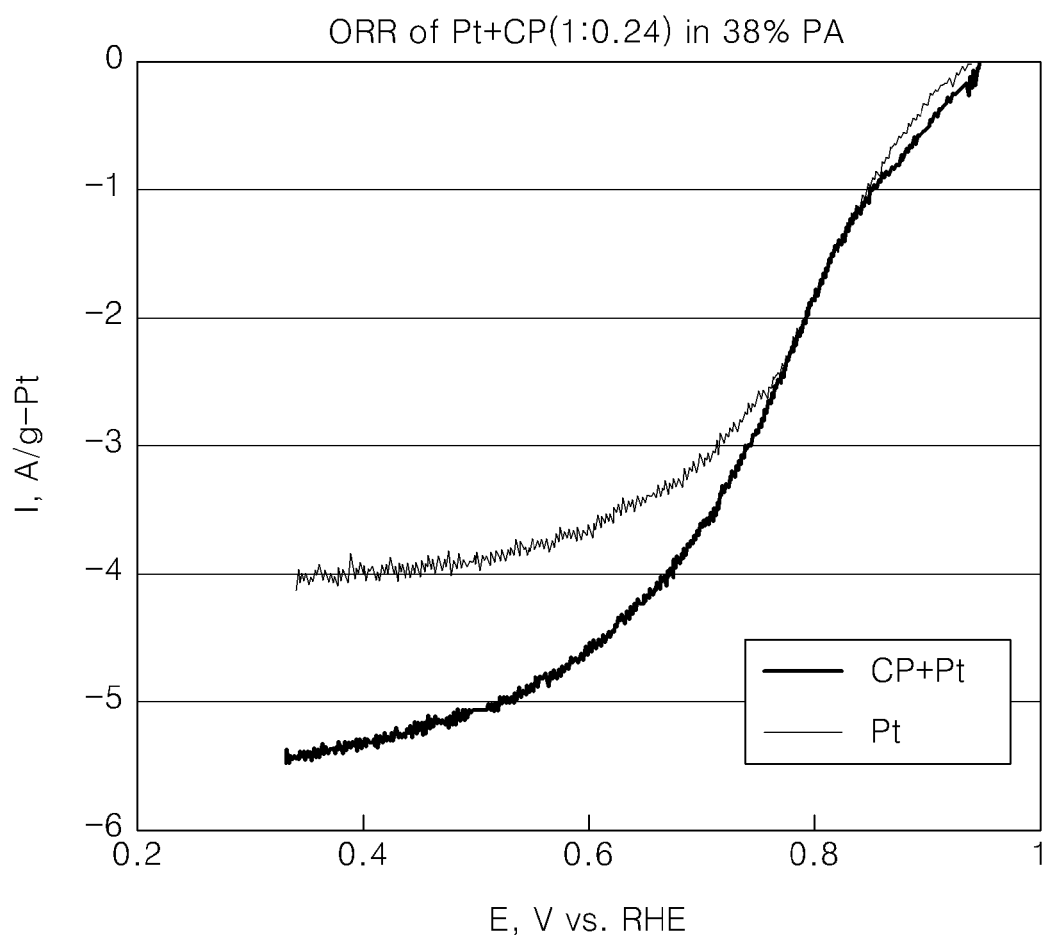
FIG. 6 shows a graph illustrating analysis results of oxygen reduction reaction (ORR) of Pt in the electrode prepared according to Example 1 of the present invention.

In the electrode, in which Pt was mixed with a pyrrole-based compound in a weight ratio of 1:0.24 and 38% by weight of phosphoric acid was used as an electrolyte, prepared according to Example 1, activity of Pt to oxygen reduction reaction (ORR) was measured (scan rate: 1 mV/s, and the number of rotations of the electrode: 1000 rpm), and the results are shown in FIG. 6. In FIG. 6, the y-axis shows current (I) standardized using Pt per unit gram, and the x-axis shows electric potential (E) converted using reference hydrogen electrode (RHE).

Referring to activity of Pt to ORR, an electrolyte is saturated with oxygen. Then, current produced by electric potential applied in decreasing amounts from open circuit voltage (OCV) is recorded. The current reaches the limit current of the material at an electric potential less than the range of 0.6 to 0.8 V in which reduction of oxygen mainly occurs. The limit current of the material is the maximized current due to exhaustion of reactants. As the number of rotations of the electrode increases in RDE experiments, supply of oxygen from electrolyte in which oxygen is dissolved to the surface of the electrode increases, and thus not only the limit current but also current in the entire electric potential region increases. The experiments were carried out at 1000 rpm, and the current values were saturated to nearly reach the limit current at 0.4 V or less. Therefore, it can be seen that a larger amount of oxygen reduction current flows in oxygen reduction reaction regions and limit current regions in the electrode including the pyrrole-based compound compared to the electrode including only Pt.

Figure 7:
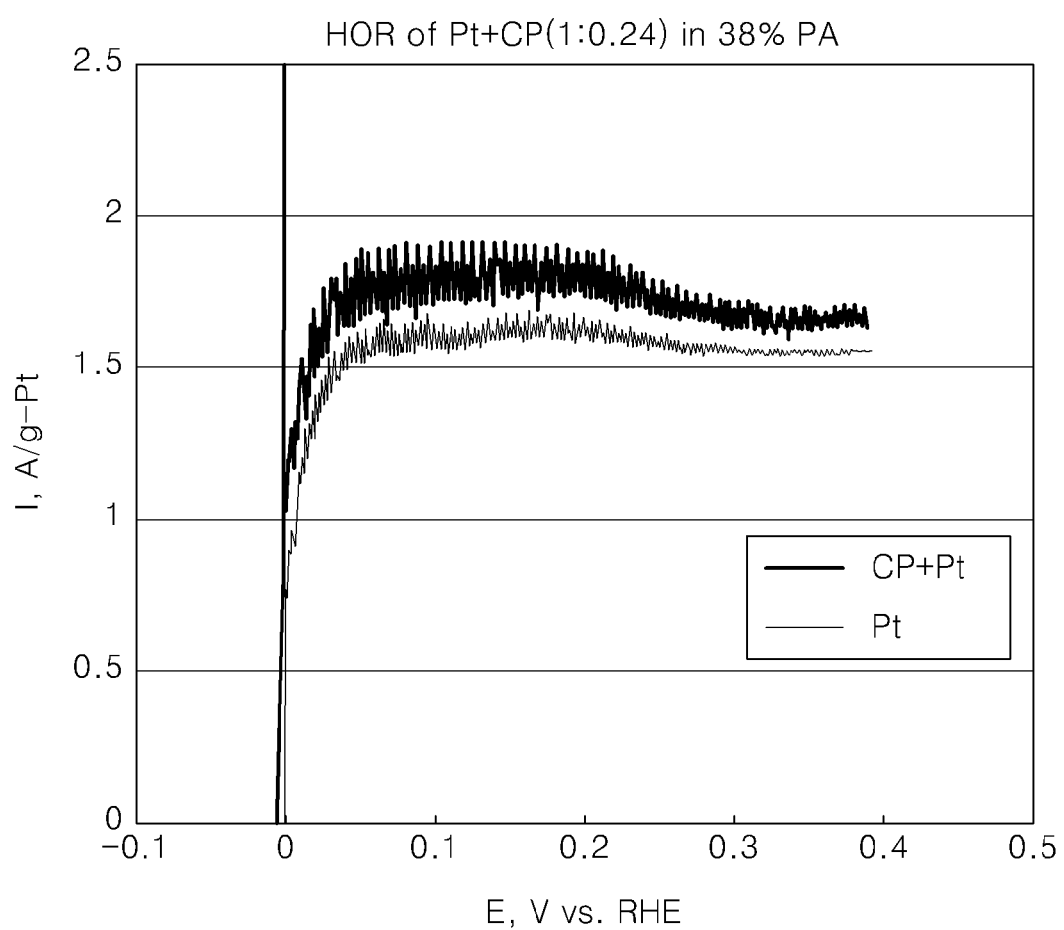
FIG. 7 shows a graph illustrating analysis results of hydrogen oxidation reaction (HOR) of Pt in the electrode prepared according to Example 1 of the present invention.
Figure 8:
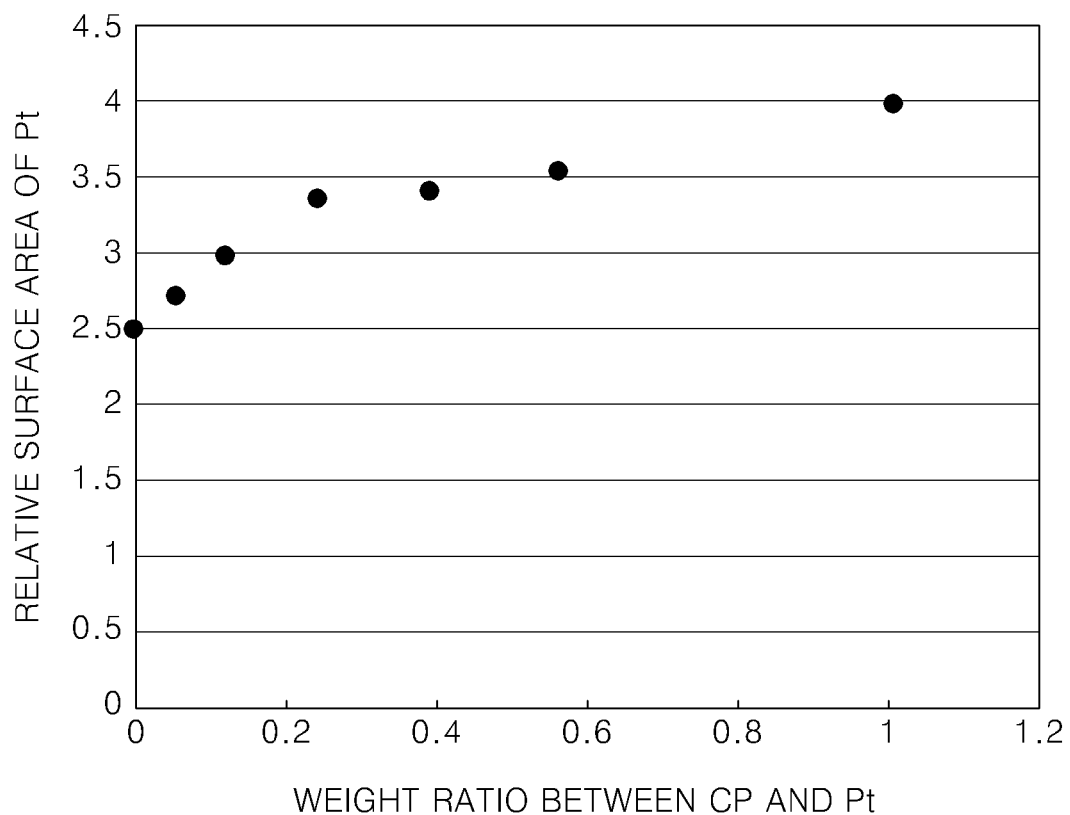
FIG. 8 shows a graph illustrating relative surface area of Pt according to the amount of the pyrrole-based compound.

In the electrode, in which Pt was mixed with a pyrrole-based compound in a weight ratio of 1:0.24 and 38% by weight of phosphoric acid was used as an electrolyte, prepared according to Example 1, activity of Pt to hydrogen oxidation reaction (HOR) was measured (scan rate: 1 mV/s and the number of rotations of the electrode: 400 rpm), and the results are shown in FIG. 7. In FIG. 7, the y-axis shows current (I) standardized using Pt per unit gram, and the x-axis shows electric potential (E) converted using reference hydrogen electrode (RHE).

Referring to activity of Pt to HOR, an electrolyte is saturated with hydrogen. Then, current produced by an electric potential applied in increasing amounts from OCV is recorded. Hydrogen has current-voltage characteristics which slightly differ from ORR since a relatively sufficient amount of hydrogen is in the electrolyte which is different from oxygen having low solubility at a high phosphoric acid concentration. As a result of cyclic voltammetry (CV), increase in the HOR was the same as the increase in the ECSA of Pt in the electrode including the pyrrole-based compound at CV.

Figure 9:
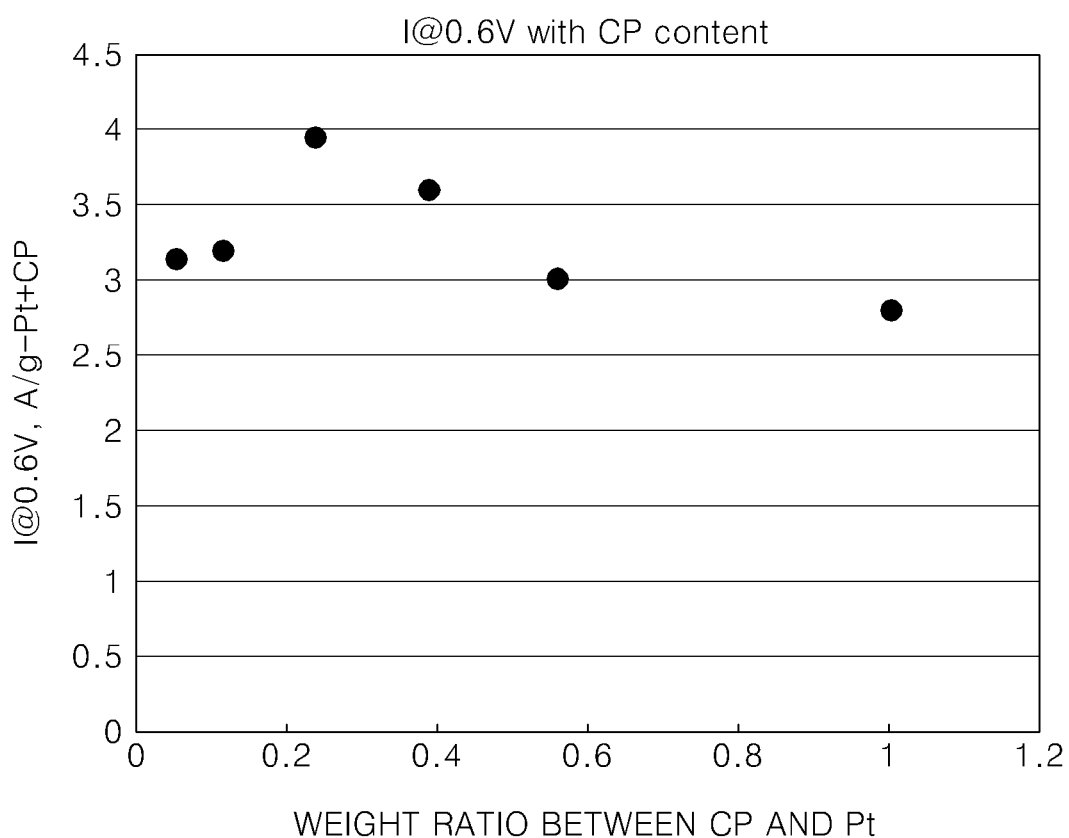
FIG. 9 shows a graph illustrating analysis results of oxygen reduction reaction (ORR) of Pt in the electrode according to Example 1 of the present invention.

FIG. 9 shows relative surface area of Pt according to the amount of the pyrrole-based compound. In the RDE experiments, current increases according to the number of rotations of the electrode (w), and limit current of a material varies according to the amount of reactants and surface area of the electrode. Such a relationship can be identified by Levich equation represented by Equation 1 below.

$$i_f = 0.62 n F A D^{2/3} \omega^{1/2} v^{-1/6} C \qquad \text{Equation 1}$$

Here, $i_f$ is the limit current of a material, n is the number of electrons participating in the reaction, F is the Faraday constant, A is surface area of the electrode, D is diffusion coefficient, v is kinematic viscosity of the electrolyte, and C is concentration of the reactants.

When the results of RDE experiments performed in the same electrolyte and at the same number of rotation are compared, D, v, and C have the same values, and thus the limit current of a material increases in proportion to the surface area of the electrode.

Using the equation, relative surface area of the electrode including the pyrrole-based compound was calculated based on the current value of the ORR per unit gram of Pt at 0.4 V at which the produced current had nearly reached the limit current. The surface area of the catalyst continuously increases as the amount of the pyrrole-based compound increases from a small quantity to the same amount as Pt. The surface area of the catalyst increases since adsorption of phosphate to Pt is more efficiently inhibited as the amount of the pyrrole-based compound increases in a highly concentrated phosphoric acid electrolyte.

FIG. 9 shows an optimized composition of the pyrrole-based compound in the ORR. ORR current values per unit gram of the Pt-pyrrole-based compound at 0.6 V within the electric potential range of 0.6 to 0.8 V in which reduction of oxygen mainly occur were shown according to the composition of the pyrrole-based compound in the electrode. As described above, when the current is indicated by a unit gram of Pt, the surface area of the catalyst increases as the amount of the pyrrole-based compound increases. However, in the preparation of electrodes for MEAs of industrial fuel cells different from the electrode for RDE, electrical conductivity decreases as the amount of an electrically non-conductive material besides a catalyst increases and mass transfer resistance increases as the thickness of the electrode increases. In order to optimize the composition of the cathode for the MEA, ORR current values per unit gram of electrolyte material (i.e., Pt+pyrrole-based compound) instead of unit gram of Pt may be compared. When the Pt was mixed with a pyrrole-based compound in a weight ratio of 1:0.24, an ORR current value can be maximized, and thus adding the pyrrole-based compound in the same weight ratio can be most effective when an electrode is prepared using Pt or a Pt alloy.

Example 2

Preparation of MEA

A cathode for an MEA prepared according to Example 1 in which Pt was mixed with the pyrrole-based compound in the weight ratio of 1:0.24 and 38% by weight of phosphoric acid aqueous solution was used as an electrolyte was prepared. An anode for an MEA prepared according to Example 1 was used as the anode.

A polybenzimidazole electrolyte membrane was interposed between the cathode and the anode, and 38% by weight of phosphoric acid aqueous solution was used as the electrolyte to prepare an MEA.

Comparative Example 1

Preparation of MEA

An MEA was prepared in the same manner as in Example 2 except that PtCo cathode without a pyrrole-based compound and PtRu/C anode without a pyrrole-based compound were used.

Figure 10:
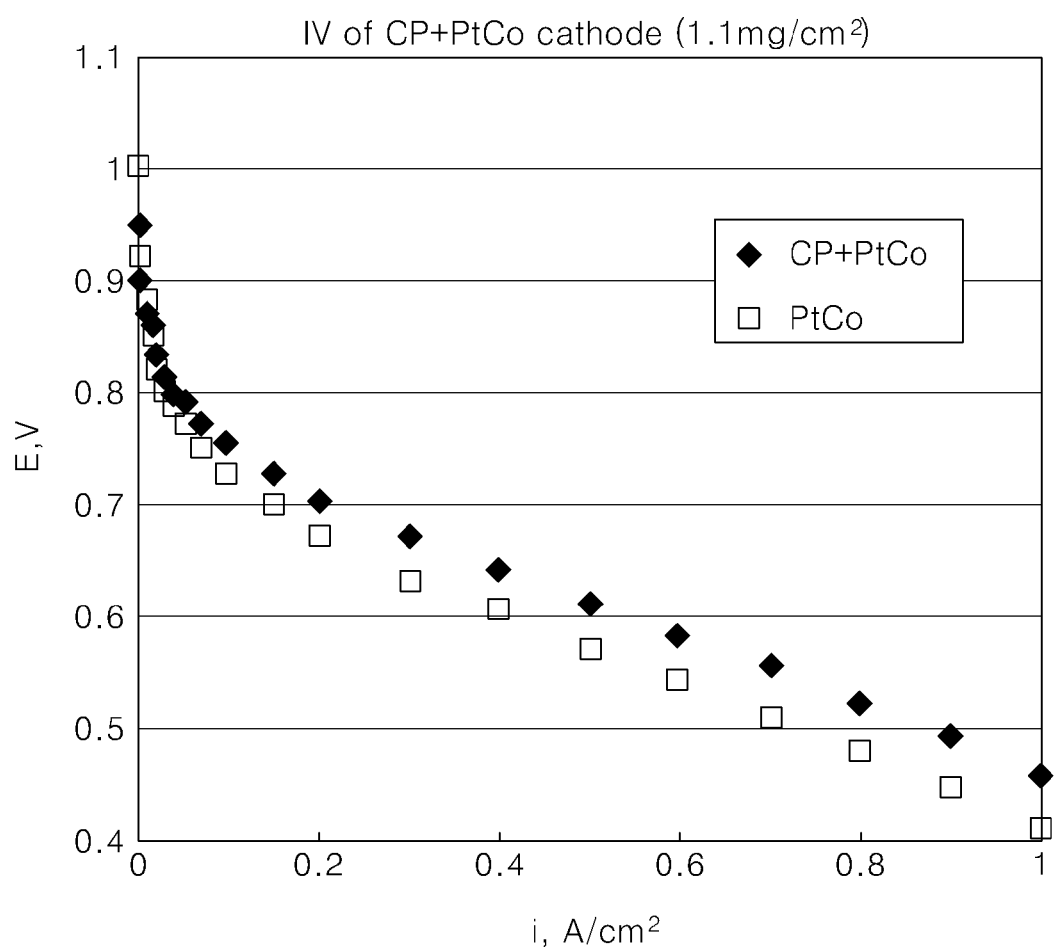
FIG. 10 shows a graph illustrating electric potentials of a membrane-electrode assembly (MEA) prepared according to Example 2 of the present invention according to current density.

Voltage changes of MEAs prepared according to Example 2 and Comparative Example 1 according to current density were measured, and the results are shown in FIG. 10.

Referring to FIG. 10, the MEA of Example 2 shows an increase in operating current over the entire voltage range.

According to the electrolyte for a fuel cell according to the present invention, an electrochemical surface area of the catalyst is maximized, and thus efficiencies in oxygen reduction reaction (ORR) and hydrogen oxidation reaction (HOR) of the catalyst are improved. Thus, a fuel cell having improved power generation efficiency may be prepared by employing the electrode.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electrode for a fuel cell, the electrode comprising a catalyst layer including a mixture of:
    a catalyst;
    a binder, the binder being at least one of styrene-butadiene rubber (SBR), the styrene-butadiene rubber (SBR) consisting of carbon and hydrogen, and polyurethane; and
    a pyrrole-based compound represented by Formula 1 below:

wherein p, q, r and s are each independently 0 or 1 and described below:
when $p=q=r=s=0$, $R_1$-$R_{16}$ are each independently a substituent listed in paragraph i) below, and $R_A$-$R_D$ are each independently a substituent listed in paragraph ii) below;
when $p=1$ and $q=r=s=0$, $R_1$-$R_{20}$ are each independently a substituent listed in paragraph i) below, and $R_A$-$R_E$ are each independently a substituent listed in paragraph ii) below;
when $p=q=1$ and $r=s=0$, $R_1$-$R_{24}$ are each independently a substituent listed in paragraph i) below, and $R_A$-$R_F$ are each independently a substituent listed in paragraph ii) below;
when $p=q=r=1$ and $s=0$, $R_1$-$R_{28}$ are each independently a substituent listed in paragraph i) below, and $R_A$-$R_G$ are each independently a substituent listed in paragraph ii) below; and
when $p=q=r=s=1$ and $R_1$-$R_{32}$ are each independently a substituent listed in paragraph i) below, and $R_A$-$R_H$ are each independently a substituent listed in paragraph ii) below, wherein paragraph i) and ii) are as follows:
i) a hydrogen atom, a halide, a hydroxyl group, a C1-C20 alkyl group, a C2-C20 alkenyl group, a C2-C20 alkynyl group, a C6-C20 aryl group, a C7-C20 alkylaryl group, a nitro group, a formyl group, a C1-C20 acyl group, a C1-C20 hydroxyalkyl group, a C1-C20 alkoxy group, a C1-C20 hydroxyalkoxy group, a C2-C20 hydroxyalkenyl group, a C2-C20 hydroxyalkynyl group, a C1-C20 alkylcarboxyl group, a carboxyl group, and an amide group, and
ii) a hydrogen atom, a C1-C20 alkyl group, a C1-C20 alkylsulfone group, a C1-C20 carboxyalkyl group, a C1-C20 carboxyamidealkyl group, and a C6-C20 aryl group.

Formula 1

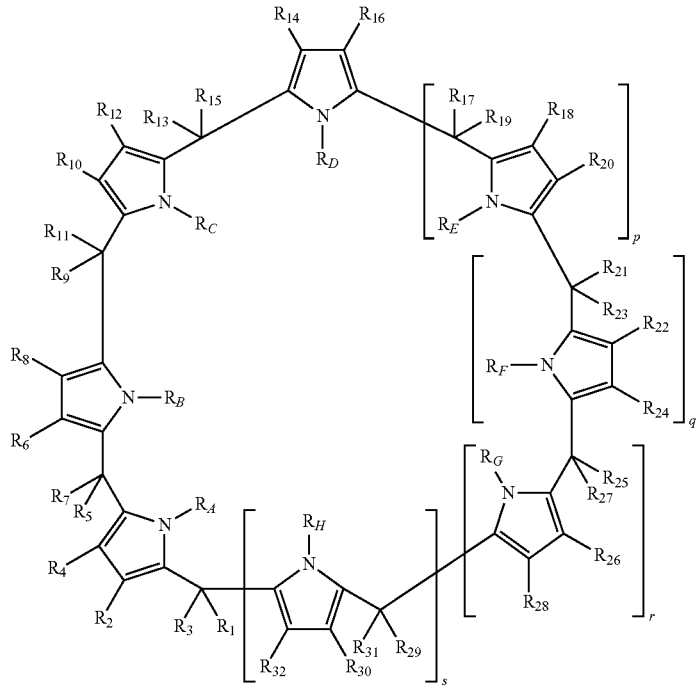

2. The electrode of claim 1, wherein the pyrrole-based compound is represented by Formula 3 below:

Formula 3

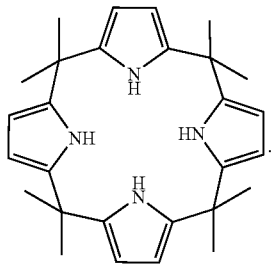

3. The electrode of claim 1, wherein the amount of the pyrrole-based compound is in the range of 0.05 to 0.5 parts by weight based on 1 part by weight of the catalyst.

4. The electrode of claim 1, wherein the catalyst layer further comprises an electrolyte.

5. The electrode of claim 4, wherein the electrolyte is phosphoric acid or a C1-C20 organic phosphonic acid.

6. The electrode of claim 1, wherein the catalyst is at least one catalyst metal selected from the group consisting of Pt, PtCo, and PtRu or a supported catalyst in which the catalyst metal is loaded on a carbonaceous support.

7. The electrode of claim 1, wherein the amount of the binder is in the range of 0.001 to 0.5 parts by weight based on 1 part by weight of the catalyst.

8. A fuel cell comprising an electrode and an electrolyte membrane interposed between the electrode and another electrode, wherein the electrode includes a catalyst, a binder that is at least one of styrene-butadiene rubber (SBR), the styrene-butadiene rubber (SBR) consisting of carbon and hydrogen, and polyurethane; and a pyrrole-based compound represented by Formula 1 below:

wherein p, q, r and s are each independently 0 or 1 and described below:
when $p=q=r=s=0$, $R_1$-$R_{16}$ are each independently a substituent listed in paragraph i) below, and $R_A$-$R_D$ are each independently a substituent listed in paragraph ii) below;
when $p=1$ and $q=r=s=0$, $R_1$-$R_{20}$ are each independently a substituent listed in paragraph i) below, and $R_A$-$R_E$ are each independently a substituent listed in paragraph ii) below;
when $p=q=1$ and $r=s=0$, $R_1$-$R_{24}$ are each independently a substituent listed in paragraph i) below, and $R_A$-$R_F$ are each independently a substituent listed in paragraph ii) below;
when $p=q=r=1$ and $s=0$, $R_1$-$R_{28}$ are each independently a substituent listed in paragraph i) below, and $R_A$-$R_G$ are each independently a substituent listed in paragraph ii) below; and
when $p=q=r=s=1$ and $R_1$-$R_{32}$ are each independently a substituent listed in paragraph i) below, and $R_A$-$R_H$ are each independently a substituent listed in paragraph ii) below,
wherein paragraph i) and ii) are as follows:
i) a hydrogen atom, a halide, a hydroxyl group, a C1-C20 alkyl group, a C2-C20 alkenyl group, a C2-C20 alkynyl group, a C6-C20 aryl group, a C7-C20 alkylaryl group, a nitro group, a formyl group, a C1-C20 acyl group, a C1-C20 hydroxyalkyl group, a C1-C20 alkoxy group, a C1-C20 hydroxyalkoxy group, a C2-C20 hydroxyalkenyl group, a C2-C20 hydroxyalkynyl group, a C1-C20 alkylcarboxyl group, a carboxyl group, and an amide group, and
ii) a hydrogen atom, a C1-C20 alkyl group, a C1-C20 alkylsulfone group, a C1-C20 carboxyalkyl group, a C1-C20 carboxyamidealkyl group, and a C6-C20 aryl group.

Formula 1

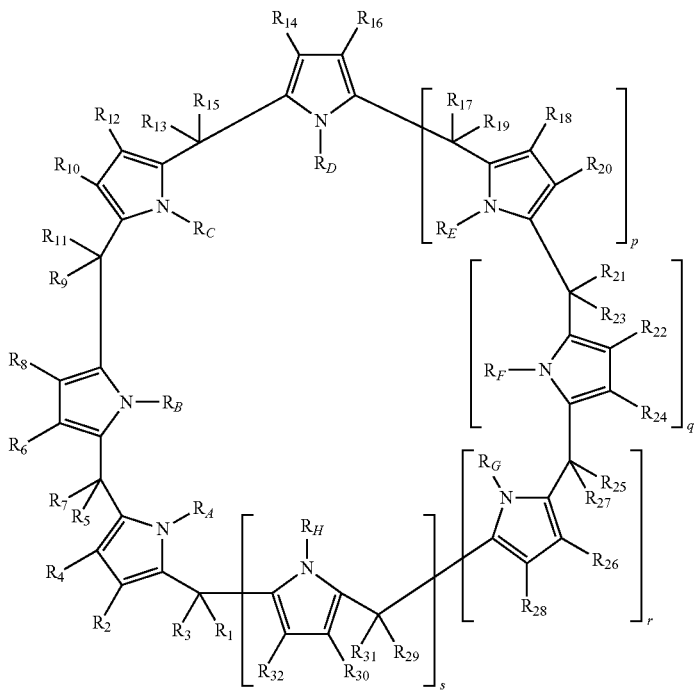

9. The fuel cell as claimed in claim 8, wherein the pyrrole-based compound is represented by Formula 3, below:

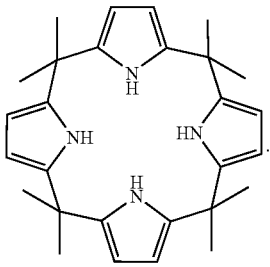

Formula 3

10. The fuel cell as claimed in claim 8, wherein the amount of the pyrrole-based compound is in the range of 0.05 to 0.5 parts by weight based on 1 part by weight of the catalyst.

11. The fuel cell as claimed in claim 8, wherein the catalyst layer further includes an electrolyte.

12. The fuel cell as claimed in claim 8, wherein the electrolyte is phosphoric acid or a C1-C20 organic phosphonic acid.

13. The fuel cell as claimed in claim 8, wherein the catalyst is at least one catalyst metal selected from Pt, PtCo, and PtRu or a supported catalyst in which the catalyst metal is loaded on a carbonaceous support.

14. The fuel cell as claimed in claim 8, wherein the amount of the binder is in the range of 0.001 to 0.5 parts by weight based on 1 part by weight of the catalyst.

15. The fuel cell as claimed in claim 8, wherein the electrolyte membrane is a polybenzimidazole electrolyte membrane or a polybenzoxazine-polybenzimidazole copolymer electrolyte membrane.

16. An electrode for a fuel cell, the electrode comprising a catalyst layer including:
a catalyst, a binder that is at least one of styrene-butadiene rubber (SBR), the styrene-butadiene rubber (SBR) consisting of carbon and hydrogen, and polyurethane, a pyrrole-based compound represented by Formula 3 and an electrolyte, wherein the electrolyte is phosphoric acid;

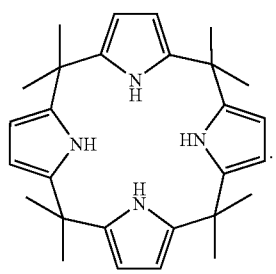

Formula 3

* * * * *